US012380274B2

(12) United States Patent
Sarkar et al.

(10) Patent No.: US 12,380,274 B2
(45) Date of Patent: Aug. 5, 2025

(54) METHODS AND SYSTEMS FOR COMPLEX NATURAL LANGUAGE TASK UNDERSTANDING FOR EMBODIED AGENTS

(71) Applicant: Tata Consultancy Services Limited, Mumbai (IN)

(72) Inventors: Chayan Sarkar, New Delhi (IN); Avik Mitra, Bangalore (IN); Pradip Pramanick, Kolkata (IN); Tapas Nayak, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 208 days.

(21) Appl. No.: 18/377,223

(22) Filed: Oct. 5, 2023

(65) Prior Publication Data

US 2024/0394474 A1 Nov. 28, 2024

(30) Foreign Application Priority Data

May 26, 2023 (IN) .............................. 202321036691

(51) Int. Cl.
*G06F 40/284* (2020.01)
*G06N 3/091* (2023.01)
(52) U.S. Cl.
CPC ........... *G06F 40/284* (2020.01); *G06N 3/091* (2023.01)
(58) Field of Classification Search
CPC ........ G06F 40/284; G06F 40/30; G06N 3/091
See application file for complete search history.

(56) References Cited

U.S. PATENT DOCUMENTS 10,706,373 B2 * 7/2020 Gruber ............ G06Q 10/06311
11,501,777 B2 * 11/2022 Sarkar ..................... G06F 40/56
(Continued)

FOREIGN PATENT DOCUMENTS

WO WO 2021/222452 A1 11/2021

OTHER PUBLICATIONS

Ahn et al., "Do As I Can, Not As I Say: Grounding Language in Robotic Affordances," (2022).
(Continued)

*Primary Examiner* — Angela A Armstrong
(74) *Attorney, Agent, or Firm* — Finnegan, Henderson, Farabow, Garrett & Dunner, LLP

(57) ABSTRACT

The disclosure generally relates to methods and systems for complex natural language task understanding for embodied robots or agents. Conventional works on relation extraction generally find relevant triplets in a natural language phrase, but neither ground the task nor ground the arguments. The present disclosure implements a Grounded Argument and Task Extraction (GATE) technique that extracts a set of tasks and relevant arguments from the complex natural language instruction. The GATE uses an encoder-decoder neural network with nested decoding technique. The extracted tasks are mapped (grounded) to the known skill set of the robot and arguments are mapped (grounded) to objects within the environment, classifies the tokens as many times as possible which existing sequence labeling cannot do. The encoder-decoder neural network of the present disclosure extracts grounded task-argument pairs from a natural language instruction in a generative mechanism, and grounds the arguments based on object detector vocabulary.

18 Claims, 9 Drawing Sheets

(56) References Cited

U.S. PATENT DOCUMENTS

2019/0244108 A1\* 8/2019 Meyerson .............. G06N 3/044
2021/0232121 A1 7/2021 Pramanick et al.

OTHER PUBLICATIONS

Lin et al., "On Grounded Planning for Embodied Tasks with Language Models," (2023).
Pramanick et al., "DeComplex: Task planning from complex natural instructions by a collocating robot," (2020).

\* cited by examiner

| index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| token | the | black | cup | is | on | the | dining | table | pick | it | and | keep | it | inside | the | fridge |
| annotation | | | | 3 3 Being_located: 1 2 Theme; 6 7 Source }<br>8 8 Picking: 1 2 Theme; 6 7 Source }<br>11 11 Placing: 1 2 Theme; 15 15 Goal; 15 15 Container object | | | | | | | | | | | | |
| BIO tag | O | B_cup | I_cup | O | O | O | B_table | I_table | O | O | O | O | O | O | O | B_refrigerator |

FIG. 5

METHODS AND SYSTEMS FOR COMPLEX NATURAL LANGUAGE TASK UNDERSTANDING FOR EMBODIED AGENTS

PRIORITY CLAIM

This U.S. patent application claims priority under 35 U.S.C. § 119 to: Indian patent application No. 202321036691, filed on May 26, 2023. The entire contents of the aforementioned application are incorporated herein by reference.

TECHNICAL FIELD

The disclosure herein generally relates to human-robot interaction (HRI), and, more particularly, methods and systems for complex natural language task understanding for embodied robots or agents.

BACKGROUND

Robots in our daily surroundings are increasing day by day. Often these robots engage with human beings and interact for various purposes. As natural language interaction capability increases the acceptability and usability of a robot, many studies have focused on natural language interaction with a robot. This can be particularly useful if the task instruction is provided in the natural language. However, large vocabulary and variation of word/phrases/sentences of any natural language (e.g., English) makes it very difficult for a robot to understand human intention and perform the task.

Recent advances in natural language processing (NLP), in particular, the rise of large-scale neural language models have simplified NLP tasks with high accuracy. However, in order for a robot to perform a task based on natural language instruction, the task intention has to be mapped to a known set of skills of the robot so that some action can be taken in the physical world (task grounding). Additionally, the objects associated with a task (task arguments) should be mapped to the objects within the environment (argument grounding). Most robots in the conventional techniques use an object detector, which uses a fixed vocabulary. A human may not be aware of that vocabulary or may not remember it. As a result, a different word/phrase can be used to refer the same object. Therefore, argument grounding becomes equally important in order to perform physical action in the environment.

Existing works on intent prediction can map the intended task to the robot's capability. However, they can neither extract the arguments associated with a task nor handle instructions with multiple (sub) tasks. Conventional works on relation extraction generally find the relevant triplets in a natural language phrase, where the triplets have the form of head, relation, and tail (h, r, t), and such techniques can be used to find a task-argument triplet. But multiple arguments may be associated with the same tasks. Extracting such triplets where the head/tail is common in many such triplets is not straightforward. Moreover, the existing techniques neither ground the task nor ground the arguments.

SUMMARY

Embodiments of the present disclosure present technological improvements as solutions to one or more of the above-mentioned technical problems recognized by the inventors in conventional systems.

In an aspect, a processor-implemented method for complex natural language task understanding for embodied robots is provided. The method including the steps of: receiving a training dataset comprising a plurality of training task instructions, wherein each training task instruction of the plurality of training task instructions is a natural language textual input; forming one or more mini-batches from the plurality of training task instructions present in the training dataset, based on a mini-batch size, wherein each mini-batch comprises one or more training task instructions out of the plurality of training task instructions and wherein a number of the one or more training task instructions present in each mini-batch is determined based on the mini-batch size; training an encoder-decoder neural network, with the one or more training task instructions present in each mini-batch a time, until the one or more mini-batches are completed to obtain a task and argument extraction model utilized for an embodied robot, wherein the encoder-decoder neural network comprises an instruction encoder and a nested decoder, wherein the nested decoder comprises an object grounding model, a grounded task extraction model, and an argument type extraction model, and wherein training the encoder-decoder neural network with each training task instruction present in each mini-batch comprises: passing each training task instruction to the instruction encoder, to obtain a plurality of encoded vectors pertaining to each training task instruction; passing the plurality of encoded vectors pertaining to each training task instruction, to the object grounding model of the nested decoder, to obtain one or more grounded arguments along with a predefined grounded argument class of one or more predefined grounded argument classes for each grounded argument, wherein each grounded argument refers to a physical object type present in a physical environment; passing the plurality of encoded vectors pertaining to each training task instruction, to the grounded task extraction model of the nested decoder, to extract one or more grounded sub-tasks in a form of a task sequence, pertaining to each training task instruction; passing each grounded sub-task of the one or more grounded sub-tasks extracted by the grounded task extraction model, to the argument type extraction model of the nested decoder, to (i) extract one or more arguments for each grounded sub-task, and (ii) map each argument with the predefined grounded argument class; calculating a value of a loss function of the encoder-decoder neural network, for each mini-batch, wherein the loss function of the encoder-decoder neural network is calculated based on (i) a loss function of the object grounding model, (ii) a loss function of the grounded task extraction model, and (iii) a loss function of the argument type extraction model; and updating one or more network parameters of the encoder-decoder neural network, based on the value of the loss function of the encoder-decoder neural network, for training with a next mini-batch. receiving a real-time task instruction for the embodied robot configured to perform in the physical environment, from a subject, wherein the real-time task instruction is the natural language textual input; and passing the real-time task instruction, to the task and argument extraction model, to extract (i) the one or more grounded arguments, (ii) the one or more grounded sub-tasks in the form of the task sequence, and (iii) the one or more arguments along with associated predefined grounded argument classes, for the embodied robot to complete the real-time task instruction.

In another aspect, a system for complex natural language task understanding for embodied robots is provided. The system includes: a memory storing instructions; one or more Input/Output (I/O) interfaces; and one or more hardware processors coupled to the memory via the one or more I/O interfaces, wherein the one or more hardware processors are configured by the instructions to: receive a training dataset comprising a plurality of training task instructions, wherein each training task instruction of the plurality of training task instructions is a natural language textual input; form one or more mini-batches from the plurality of training task instructions present in the training dataset, based on a mini-batch size, wherein each mini-batch comprises one or more training task instructions out of the plurality of training task instructions and wherein a number of the one or more training task instructions present in each mini-batch is determined based on the mini-batch size; train an encoder-decoder neural network, with the one or more training task instructions present in each mini-batch a time, until the one or more mini-batches are completed to obtain a task and argument extraction model utilized for an embodied robot, wherein the encoder-decoder neural network comprises an instruction encoder and a nested decoder, wherein the nested decoder comprises an object grounding model, a grounded task extraction model, and an argument type extraction model, and wherein training the encoder-decoder neural network with each training task instruction present in each mini-batch comprises: passing each training task instruction to the instruction encoder, to obtain a plurality of encoded vectors pertaining to each training task instruction; passing the plurality of encoded vectors pertaining to each training task instruction, to the object grounding model of the nested decoder, to obtain one or more grounded arguments along with a predefined grounded argument class of one or more predefined grounded argument classes for each grounded argument, wherein each grounded argument refers to a physical object type present in a physical environment; passing the plurality of encoded vectors pertaining to each training task instruction, to the grounded task extraction model of the nested decoder, to extract one or more grounded sub-tasks in a form of a task sequence, pertaining to each training task instruction; passing each grounded sub-task of the one or more grounded sub-tasks extracted by the grounded task extraction model, to the argument type extraction model of the nested decoder, to (i) extract one or more arguments for each grounded sub-task, and (ii) map each argument with the predefined grounded argument class; calculating a value of a loss function of the encoder-decoder neural network, for each mini-batch, wherein the loss function of the encoder-decoder neural network is calculated based on (i) a loss function of the object grounding model, (ii) a loss function of the grounded task extraction model, and (iii) a loss function of the argument type extraction model; and updating one or more network parameters of the encoder-decoder neural network, based on the value of the loss function of the encoder-decoder neural network, for training with a next mini-batch; receive a real-time task instruction for the embodied robot configured to perform in the physical environment, from a subject, wherein the real-time task instruction is the natural language textual input; and pass the real-time task instruction, to the task and argument extraction model, to extract (i) the one or more grounded arguments, (ii) the one or more grounded sub-tasks in the form of the task sequence, and (iii) the one or more arguments along with associated predefined grounded argument classes, for the embodied robot to complete the real-time task instruction.

In yet another aspect, there are provided one or more non-transitory machine-readable information storage mediums comprising one or more instructions which when executed by one or more hardware processors cause: receiving a training dataset comprising a plurality of training task instructions, wherein each training task instruction of the plurality of training task instructions is a natural language textual input; forming one or more mini-batches from the plurality of training task instructions present in the training dataset, based on a mini-batch size, wherein each mini-batch comprises one or more training task instructions out of the plurality of training task instructions and wherein a number of the one or more training task instructions present in each mini-batch is determined based on the mini-batch size; training an encoder-decoder neural network, with the one or more training task instructions present in each mini-batch a time, until the one or more mini-batches are completed to obtain a task and argument extraction model utilized for an embodied robot, wherein the encoder-decoder neural network comprises an instruction encoder and a nested decoder, wherein the nested decoder comprises an object grounding model, a grounded task extraction model, and an argument type extraction model, and wherein training the encoder-decoder neural network with each training task instruction present in each mini-batch comprises: passing each training task instruction to the instruction encoder, to obtain a plurality of encoded vectors pertaining to each training task instruction; passing the plurality of encoded vectors pertaining to each training task instruction, to the object grounding model of the nested decoder, to obtain one or more grounded arguments along with a predefined grounded argument class of one or more predefined grounded argument classes for each grounded argument, wherein each grounded argument refers to a physical object type present in a physical environment; passing the plurality of encoded vectors pertaining to each training task instruction, to the grounded task extraction model of the nested decoder, to extract one or more grounded sub-tasks in a form of a task sequence, pertaining to each training task instruction; passing each grounded sub-task of the one or more grounded sub-tasks extracted by the grounded task extraction model, to the argument type extraction model of the nested decoder, to (i) extract one or more arguments for each grounded sub-task, and (ii) map each argument with the predefined grounded argument class; calculating a value of a loss function of the encoder-decoder neural network, for each mini-batch, wherein the loss function of the encoder-decoder neural network is calculated based on (i) a loss function of the object grounding model, (ii) a loss function of the grounded task extraction model, and (iii) a loss function of the argument type extraction model; and updating one or more network parameters of the encoder-decoder neural network, based on the value of the loss function of the encoder-decoder neural network, for training with a next mini-batch; receiving a real-time task instruction for the embodied robot configured to perform in the physical environment, from a subject, wherein the real-time task instruction is the natural language textual input; and passing the real-time task instruction, to the task and argument extraction model, to extract (i) the one or more grounded arguments, (ii) the one or more grounded sub-tasks in the form of the task sequence, and (iii) the one or more arguments along with associated predefined grounded argument classes, for the embodied robot to complete the real-time task instruction.

In an embodiment, passing each training task instruction to the instruction encoder, to obtain the plurality of encoded vectors pertaining to each training task instruction, comprises: tokenizing each training task instruction using a pre-trained language model-based tokenizer of the instruction encoder, to obtain a plurality of tokens pertaining to each training task instruction; and passing the plurality of tokens pertaining to each training task instruction, to a pre-trained language model-based encoder of the instruction encoder, to obtain the plurality of encoded vectors pertaining to each training task instruction, wherein each encoded vector of the plurality of encoded vectors is associated to each token of the plurality of tokens pertaining to each training task instruction.

In an embodiment, passing the plurality of encoded vectors pertaining to each training task instruction, to the object grounding model of the nested decoder, to obtain the one or more grounded arguments along with the predefined grounded argument class of the one or more predefined grounded argument classes for each grounded argument (306b), comprises: passing the plurality of encoded vectors pertaining to each training task instruction, to a first feed-forward layer of the object grounding model, to classify each of the one or more grounded arguments, with the predefined grounded argument class, by a soft-max classifier of the object grounding model using a Beginning Inside and Outside (BIO) sequence labelling approach.

In an embodiment, passing the plurality of encoded vectors pertaining to each training task instruction, to the grounded task extraction model of the nested decoder, to extract the one or more grounded sub-tasks in the form of the task sequence, pertaining to each training task instruction, comprises: passing the plurality of encoded vectors pertaining to each training task instruction, to a first attention network of the grounded task extraction model, to generate a context vector of each grounded sub-task of the one or more sub-tasks; passing the context vector of each grounded sub-task of the one or more grounded sub-tasks, to a first long short-term memory (LSTM) network of the grounded task extraction model, to generate a plurality of task hidden vectors of each grounded sub-task; concatenating (i) the plurality of encoded vectors and (ii) the plurality of task hidden vectors, of each grounded sub-task, pertaining to each training task instruction, to obtain a plurality of concatenated task hidden vectors for each grounded sub-task, pertaining to each training task instruction; passing the plurality of concatenated task hidden vectors of each grounded sub-task, pertaining to each training task instruction, to a first span detection network of the grounded task extraction model, to generate a task span of each grounded sub-task; concatenating (i) the plurality of task hidden vectors and (ii) the task span, of each grounded sub-task, to obtain a plurality of concatenated span mark task hidden vectors of each grounded sub-task; and passing the plurality of concatenated span mark task hidden vectors of each grounded sub-task, to a second feed-forward layer of the grounded task extraction model, to classify each of the one or more grounded sub-tasks, with a predefined grounded task class, by a soft-max classifier of the grounded task extraction model.

In an embodiment, passing each grounded sub-task of the one or more grounded sub-tasks extracted by the grounded task extraction model, to the argument type extraction model of the nested decoder, to (i) extract the one or more arguments for each grounded sub-task, and (ii) map each argument with the predefined grounded argument class, comprises: concatenating (i) the plurality of encoded vectors, (ii) the plurality of task hidden vectors, and (iii) the one or more grounded arguments, of each grounded sub-task, to obtain a plurality of concatenated result vectors, for each grounded sub-task; passing the plurality of concatenated result vectors of each grounded sub-task, to a second attention network of the argument type extraction model, to obtain one or more encoded context vectors of each grounded sub-task; passing each of the one or more encoded context vectors of each grounded sub-task, to a second LSTM network of the argument type extraction model, to generate a plurality of argument hidden vectors for each encoded context vector; concatenating (i) the plurality of argument hidden vectors for each encoded context vector and (ii) the plurality of encoded vectors pertaining to the training task instruction, to obtain a plurality of concatenated argument hidden vectors, for each encoded context vector; passing the plurality of concatenated argument hidden vectors, for each encoded context vector, to a second span detection network of the argument type extraction model, to generate an argument span for each encoded context vector; concatenating (i) the plurality of argument hidden vectors and (ii) the argument span, for each encoded context vector, to obtain concatenated span mark argument hidden vectors of each encoded context vector; and passing the concatenated span mark argument hidden vectors of each encoded context vector, to a third feed-forward layer of the argument type extraction model, to classify each encoded context vector, by a soft-max classifier of the argument type extraction model, to (i) extract the one or more arguments for each grounded sub-task, and (ii) map each argument with the predefined grounded argument class.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 5 is an exemplary annotation schema of an exemplary natural language task instruction, in accordance with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Figure 1A:
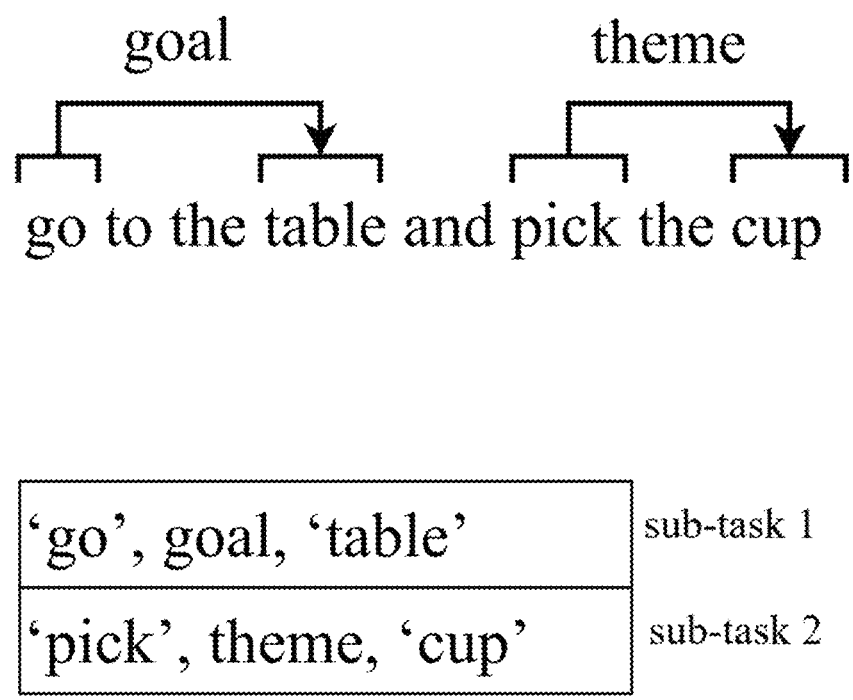
FIGS. 1A, 1B and 1C, show exemplary task instructions, and extraction of sub-tasks and arguments from the exemplary task instructions by conventional techniques in the art.
Figure 1B:
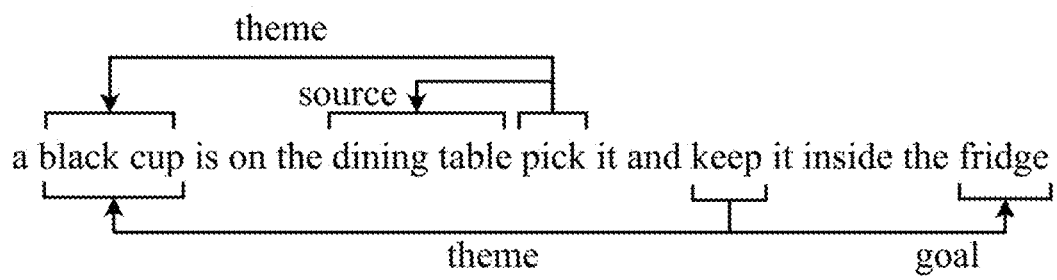
Figure 1C:
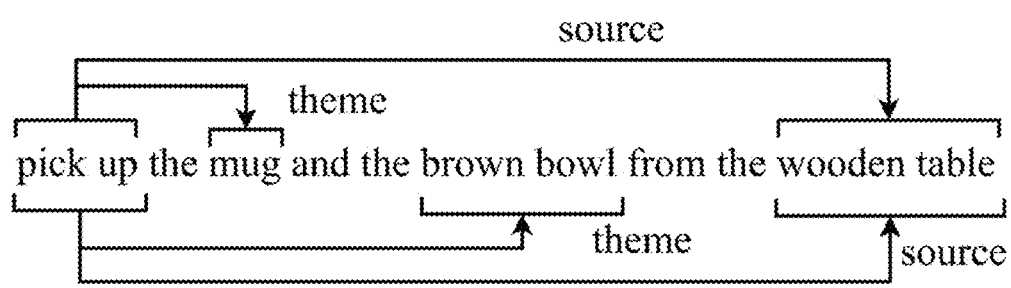

FIGS. 1A, 1B and 1C, show exemplary natural language task instructions, and extraction of sub-tasks and arguments from the exemplary natural language task instructions by conventional techniques in the art. As shown in FIG. 1A, the exemplary natural language task instruction is 'go to the table and pick the cup'. It has two simple sub-tasks with a single argument each. For this kind of natural language task instruction, the conventional triplet extractor can be employed for task and argument pair extraction. The conventional triplet extractor can extract the task-argument triplet from such simple natural language task instruction. But multiple arguments may be associated with the same sub-tasks.

But multiple arguments may be associated with the same sub-tasks. Extracting such triplets where the head/tail is common in many such triplets is not straightforward. FIG. 1B shows the exemplary natural language task instructions with two sub-tasks with multiple arguments and a common argument. The exemplary natural language task instruction in FIG. 1B is an example of why it is necessary to ground the task and argument along with co-reference resolution. FIG. 1C shows the exemplary natural language task instructions with two sub-tasks with the common task phrase and a common argument. The exemplary natural language task instruction in FIG. 1C is an example of why generative approach for task and argument extraction is required.

The conventional techniques neither ground the tasks nor the arguments. For example, in FIG. 1B, the word 'keep' signifies the 'placing' task according to the robot capability, and the word 'fridge' needs to be mapped to 'Refrigerator' according to the object detector vocabulary. Similarly, the same task phrase 'pick up' as well as the same argument phrase 'wooden table' are shared by two sub-tasks shared by two sub-tasks as shown in FIG. 1C. This can be only possible if the natural language understanding (NLU) system can generate as many triplets as possible from the given natural language phase (instruction) without any limitation.

There are three different areas in the NLP tasks that are relevant to the present disclosure are: (i) a sequence-to-sequence learning, (ii) a structured information extraction, and (iii) a natural language understanding of instructions for the robots.

In the sequence-to-sequence learning, encoder-decoder models are popular for the sequence-to-sequence (S2S) learning. There are different types of S2S tasks for which encoder-decoder architecture is used, e.g., neural machine translation, joint entity and relation extraction, cross-lingual open information extraction, joint extraction of aspect-opinion-sentiment triplets, and so on.

The structured information extraction from unstructured text is an important task in natural language processing. Entity-Relation extraction, aspect-sentiment triplets extraction, causality extraction, event extraction, attribute-value extraction are such important tasks. A Beginning Inside and Outside (BIO) tag-based sequence labeling models are popular to extract structure information from text. In recent times, pointer networks are explored for such tasks. The pointer networks for the machine-reading comprehension task are used to identify the answer span in the passage. Some similar pointer networks are used to identify the entities in sentences for joint entity and relation extraction tasks, casual spans in the text, joint extraction of aspect opinion-sentiment triplets from online reviews, and so on.

The natural language understanding for robots mostly involves executing human-provided directives given in natural language. Significant progress has been made by—(i) restricting the action space of the robot to navigation, i.e., posing it as a Vision and Language Navigation (VLN) problem, and (ii) providing detailed step-by-step instructions that either reduce or remove the burden of planning from high-level task goals. A few works have attempted to include manipulation in VLN, but still allowing step-by-step instructions and limited to a single or a constrained set of manipulation actions. The present disclosure focusses on a more general problem that assumes the arbitrary action capabilities of a robot that includes both navigation and manipulation. Thus, the problem can be defined as generating an action sequence (plan) for a high-level natural language instruction that contains one or more sub-goals (not explicitly detailed). Several approaches have been proposed to solve this. Predominant techniques exploit the embodied nature of a robotic agent to infer and refine the plan by primarily using multi-modal input that includes visual feedback and action priors. Thus, natural language understanding in these systems is simplified by obtaining a latent representation of the language input to bias the inference using attention modeling. Embodied agents that can answer natural language queries have also been developed by following a similar approach of planning by biasing the agent's exploration using latent linguistic representations.

Several works proposed models that perform visual grounding of referring expressions in an embodied agent's ego-view, following a similar approach for encoding language input. A major limitation of this approach of end-to-end learning with multi-modal input is that the models are often heavily biased towards a specific dataset, simulator, and agent with specific capabilities. Thus, these often exhibit poor generalization to unseen environments and fail to generate plan for unseen composition of sub-goals. Though these models are particularly effective for detailed instructions with explicitly mentioned sub-goals in known environments, these often generate incorrect plan for high-level instructions with implicit sub-goals that require long-horizon task planning.

Several works have proposed modular methods that segment the instruction into a sequence of task types and training separate seq2seq models for different task types, and that decouple multi-modal seq2seq learning into separate language understanding, perception, and controller components. However, these models directly predict low-level action sequence or grounded goal predicates; thus, still learns agent and environment specific representations. Some other works further decoupled plan generation into task and argument prediction and use domain-specific templates to generate the task plan, while achieving a significant improvement. Their approach of parsing natural language into a structured, symbolic representation has been extensively studied in earlier works along with formal methods of task planning.

Further, the existing approaches of structured prediction from instructions follow a sequence labeling approach which has two major limitations: (i) they can't classify tokens multiple times and/or with separate class label, and (ii) they can't handle co-reference in complex instructions.

The present disclosure solves the technical problems in the art to understand the natural language and extract the tasks for the robots, using a novel deep neural network architecture, called Grounded Argument and Task Extraction (GATE) that can extract the set of tasks and their relevant arguments from the complex natural language instruction. The GATE follows an encoder-decoder neural network based architecture, where the decoder follows a layered structure to extract the relevant information. Unlike existing triplet extractors that find triplets in the form of (h, r, t), GATE finds pentuple ($h_g$, r, $t_g$), where $h_g$ and $t_g$ represent the grounded values of the head (h) and tail (t), respectively. Additionally, the model can resolve co-reference, handle shared tasks & arguments, and generate as many triplets as possible.

The present disclosure follows the similar approach of the sequence labeling, but the generative model of the present disclosure has significant advantages over conventional sequence labeling approaches. The encoder-decoder neural network for natural language understanding of the present disclosure that employs layered (recursive) decoding. The encoder-decoder neural network of the present disclosure is flexible in the sense that the set of tasks and/or argument lists can be increased or decreased without changing the architecture. The encoder-decoder neural network of the present disclosure extracts grounded task-argument pairs from a natural language instruction in a generative mechanism. This can handle the shared task and/or argument phrase. Further, the encoder-decoder neural network of the present disclosure can ground the argument based on object detector vocabulary. The task-argument relation data and argument grounding data are detached in a way that the object detector as well as the class of objects can be expanded/modified easily.

Referring now to the drawings, and more particularly to FIG. 2 through FIG. 6B, where similar reference characters denote corresponding features consistently throughout the figures, there are shown preferred embodiments and these embodiments are described in the context of the following exemplary systems and/or methods.

Figure 2:
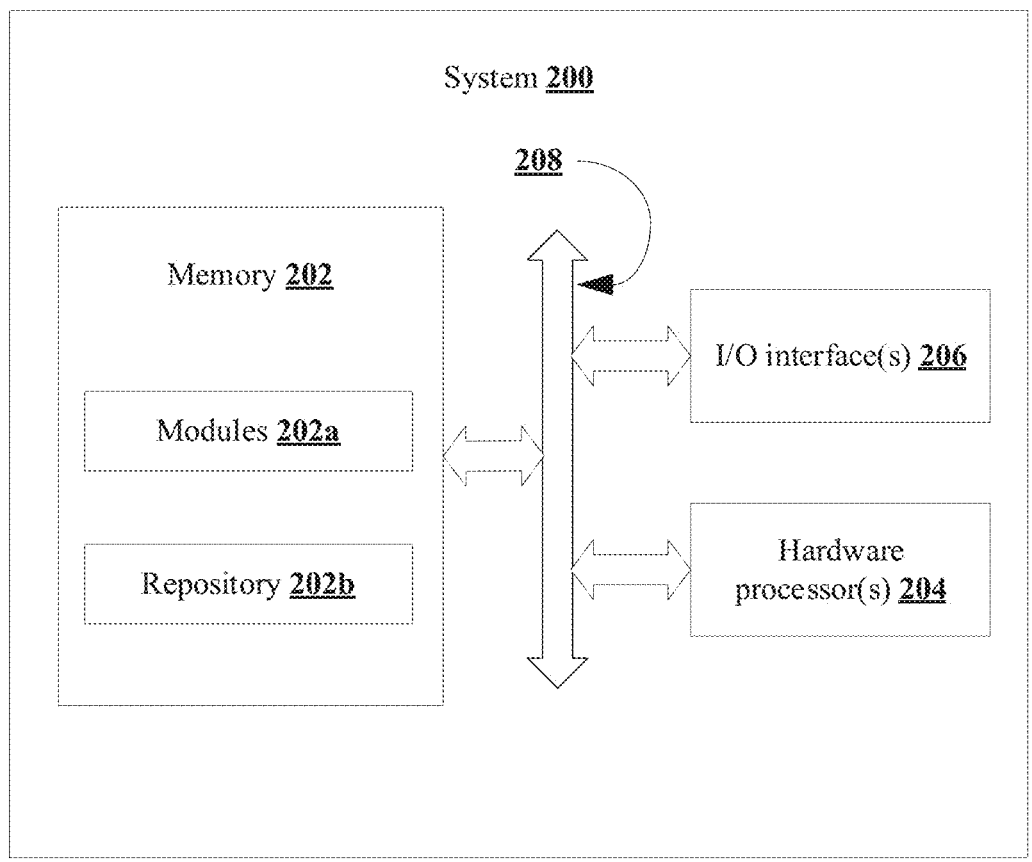
FIG. 2 is an exemplary block diagram of a system for complex natural language task understanding for embodied robots, in accordance with some embodiments of the present disclosure.

FIG. 2 is an exemplary block diagram of a system 200 for complex natural language task understanding for embodied robots, in accordance with some embodiments of the present disclosure. In an embodiment, the system 200 includes or is otherwise in communication with one or more hardware processors 204, communication interface device(s) or input/output (I/O) interface(s) 206, and one or more data storage devices or memory 202 operatively coupled to the one or more hardware processors 204. The one or more hardware processors 204, the memory 202, and the I/O interface(s) 206 may be coupled to a system bus 208 or a similar mechanism.

The I/O interface(s) 206 may include a variety of software and hardware interfaces, for example, a web interface, a graphical user interface, and the like. The I/O interface(s) 206 may include a variety of software and hardware interfaces, for example, interfaces for peripheral device(s), such as a keyboard, a mouse, an external memory, a plurality of sensor devices, a printer and the like. Further, the I/O interface(s) 206 may enable the system 200 to communicate with other devices, such as web servers and external databases.

The I/O interface(s) 206 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 206 may include one or more ports for connecting a number of computing systems with one another or to another server computer. Further, the I/O interface(s) 206 may include one or more ports for connecting a number of devices to one another or to another server.

The one or more hardware processors 204 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 204 are configured to fetch and execute computer-readable instructions stored in the memory 202. In the context of the present disclosure, the expressions 'processors' and 'hardware processors' may be used interchangeably. In an embodiment, the system 200 can be implemented in a variety of computing systems, such as laptop computers, portable computers, notebooks, hand-held devices, workstations, mainframe computers, servers, a network cloud and the like.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 202 includes a plurality of modules 202a and a repository 202b for storing data processed, received, and generated by one or more of the plurality of modules 202a. The plurality of modules 202a may include routines, programs, objects, components, data structures, and so on, which perform particular tasks or implement particular abstract data types.

The plurality of modules 202a may include programs or computer-readable instructions or coded instructions that supplement applications or functions performed by the system 200. The plurality of modules 202a may also be used as, signal processor(s), state machine(s), logic circuitries, and/or any other device or component that manipulates signals based on operational instructions. Further, the plurality of modules 202a can be used by hardware, by computer-readable instructions executed by the one or more hardware processors 204, or by a combination thereof. In an embodiment, the plurality of modules 202a can include various sub-modules (not shown in FIG. 2). Further, the memory 202 may include information pertaining to input(s)/output(s) of each step performed by the processor(s) 204 of the system 200 and methods of the present disclosure.

The repository 202b may include a database or a data engine. Further, the repository 202b amongst other things, may serve as a database or includes a plurality of databases for storing the data that is processed, received, or generated as a result of the execution of the plurality of modules 202a. Although the repository 202b is shown internal to the system 200, it will be noted that, in alternate embodiments, the repository 202b can also be implemented external to the system 200, where the repository 202b may be stored within an external database (not shown in FIG. 2) communicatively coupled to the system 200. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 202b may be distributed between the system 200 and the external database.

Figure 3A:
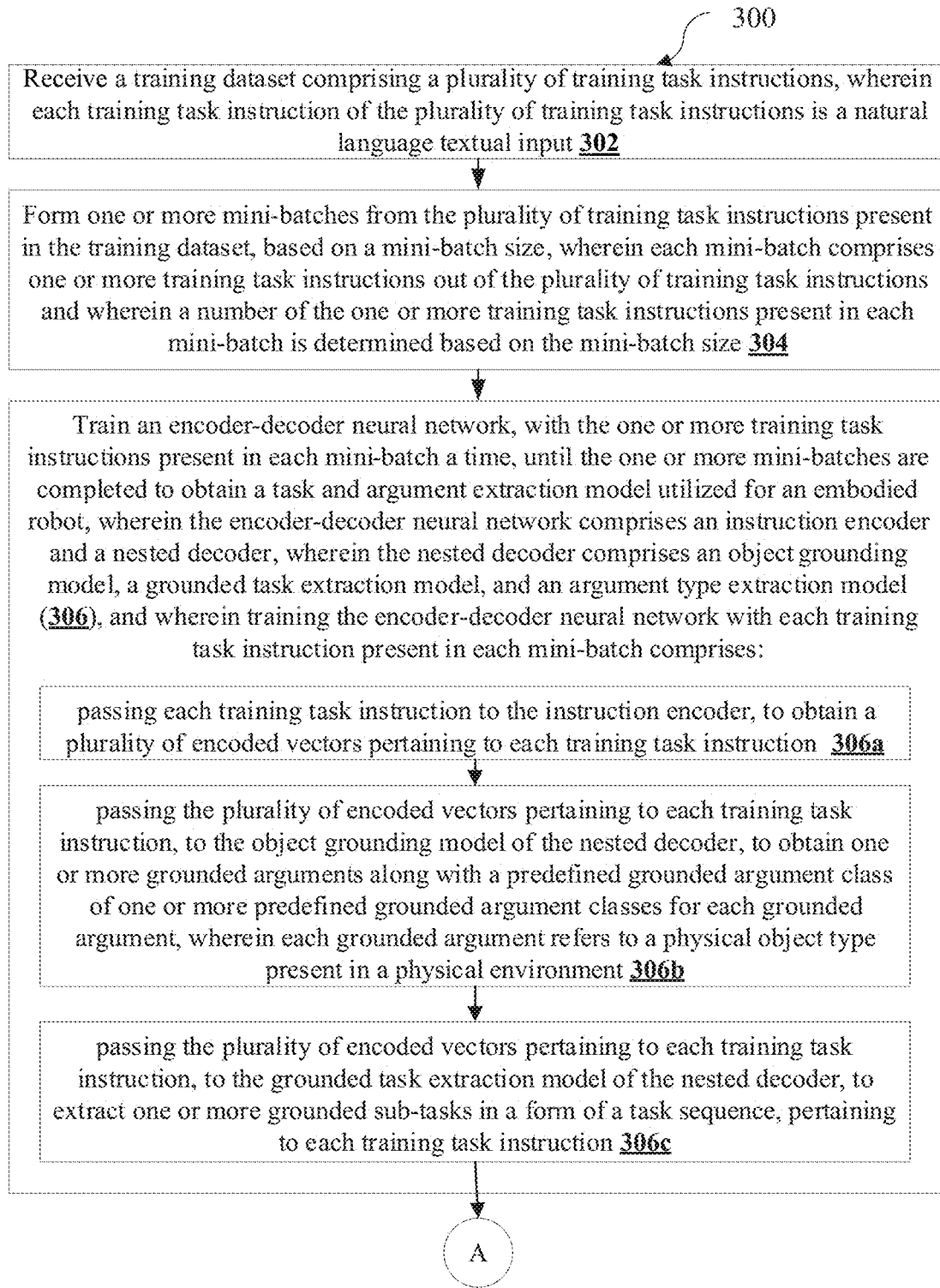
FIGS. 3A and 3B illustrate exemplary flow diagrams of a processor-implemented method for complex natural language task understanding for embodied robots, in accordance with some embodiments of the present disclosure.
Figure 3B:
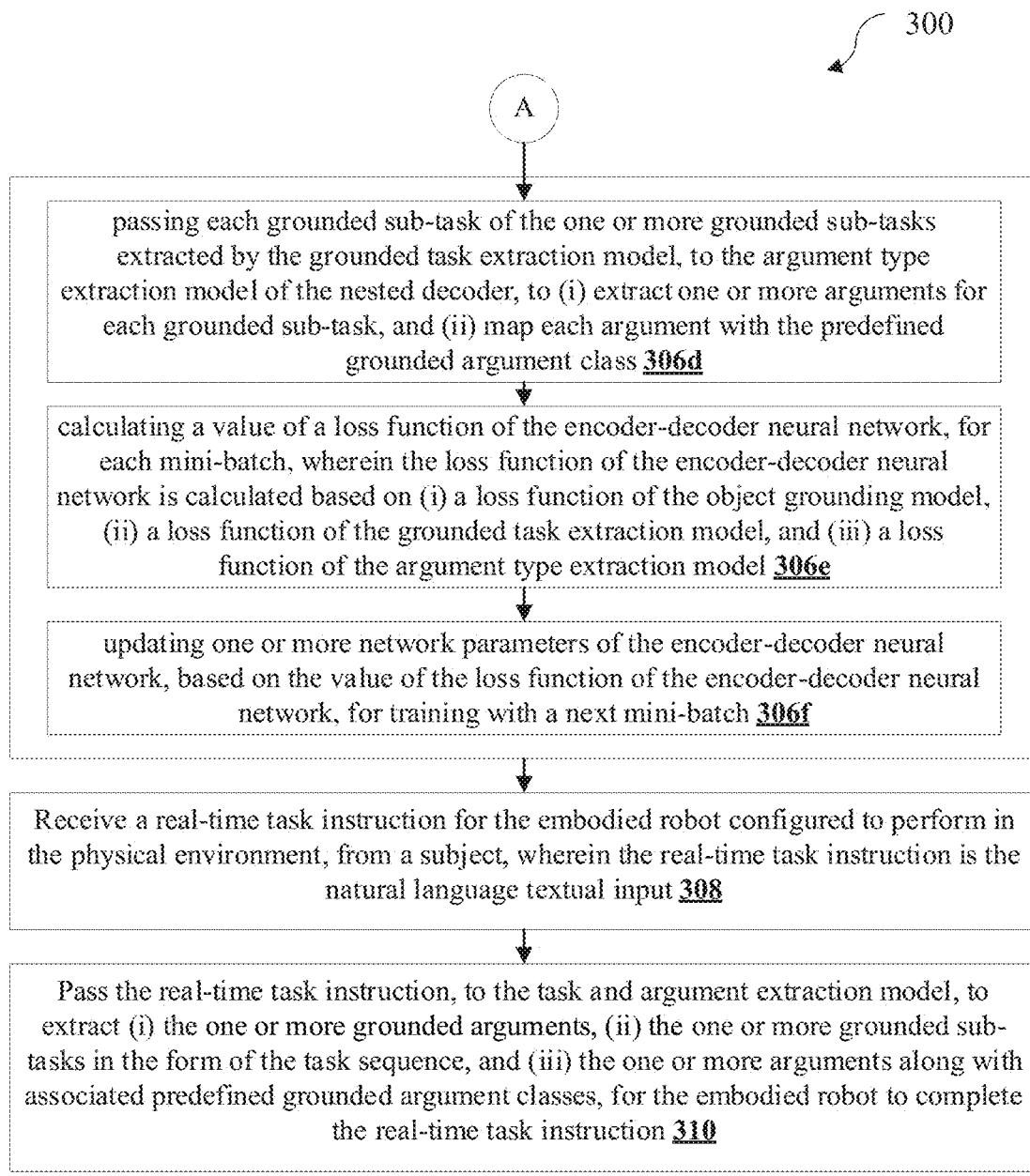

Referring to FIGS. 3A and 3B, components and functionalities of the system 200 are described in accordance with an example embodiment of the present disclosure. For example, FIGS. 3A and 3B illustrate exemplary flow diagrams of a processor-implemented method 300 for complex natural language task understanding for embodied robots, in accordance with some embodiments of the present disclosure. Although steps of the method 300 including process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 302 of the method 300, the one or more hardware processors 104 of the system 100 are configured to receive a training dataset comprising a plurality of training task instructions. Each training task instruction of the plurality of training task instructions is a natural language textual input for instructing the robots. Each training task instruction is a complex natural language task instruction containing one or more sub-tasks that have a logical and a sequential flow (one sub-task after the other) in order to complete the whole task instruction. Further, each training task instruction is the natural language textual input that is obtained from natural language speech or audio of the human by converting from audio to the text.

Given a natural language instruction $X=\{x_1, x_2, \ldots, x_n\}$ with n tokens, the goal is to extract a set of tasks, $T=[t_j|t_j=(t_j^s, t_j^e, t_j^I)]_{j=1}^{|T|}$; where $t_j$ is the j'th task, $|T|$ is the number of tasks, $t_j^s$ and $t_j^e$ represents the positions of the start and end tokens of the task description span, and ti represents the type of the task (grounded task). Additionally, the set of arguments for each task are extracted. Specifically, for task $t_j$, the set of arguments, $A_j=[a_{jk}|a_{jk}=(a_{jk}^s, a_{jk}^e, a_{jk}^I)]_{k=1}^{|A_j|}$ are extracted where $a_{jk}$ is the k'th argument, $|A_j|$ is the number of arguments for the task, $a_{jk}^s$ and $a_{jk}^e$ represents the positions of the start and end tokens of the argument description span, and al represents the type of the argument. The number of arguments for the tasks can be different. Additionally, the grounding of the arguments, i.e., map the span of an argument to an object is performed if it is a physical object.

At step 304 of the method 300, the one or more hardware processors 104 of the system 100 are configured to form one or more mini-batches from the plurality of training task instructions present in the training dataset, based on a mini-batch size. The mini-batch size is a predefined mini-batch based on the configuration and architecture of the neural network mentioned at the later steps. Each mini-batch comprises one or more training task instructions out of the plurality of training task instructions. Number of the one or more training task instructions present in each mini-batch is determined based on the mini-batch size. It is noted that the one or more training task instructions present in the last mini-batch may not have the number of the training task instructions equal to the mini-batch size. The situation arises only if the mini-batch size is not completely divisible by the number of the plurality of training task instructions present in the training dataset.

At step 306 of the method 300, the one or more hardware processors 104 of the system 100 are configured to train an encoder-decoder neural network, with the one or more training task instructions present in each mini-batch a time, until the one or more mini-batches are completed. The training of the encoder-decoder neural network is done with the one or more training task instructions present in each mini-batch at a time. Once the training with one mini-batch is completed, the one or more network parameters (also called as network weights) of the encoder-decoder neural network back-propagated for the training with the next mini-batch, and so on. Once the training of the encoder-decoder neural network is completed with all the mini-batches (the one or more mini-batches), a task and argument extraction model is obtained, and is utilized for an embodied robot, for the complex natural language task understanding of each task instruction.

Figure 4:
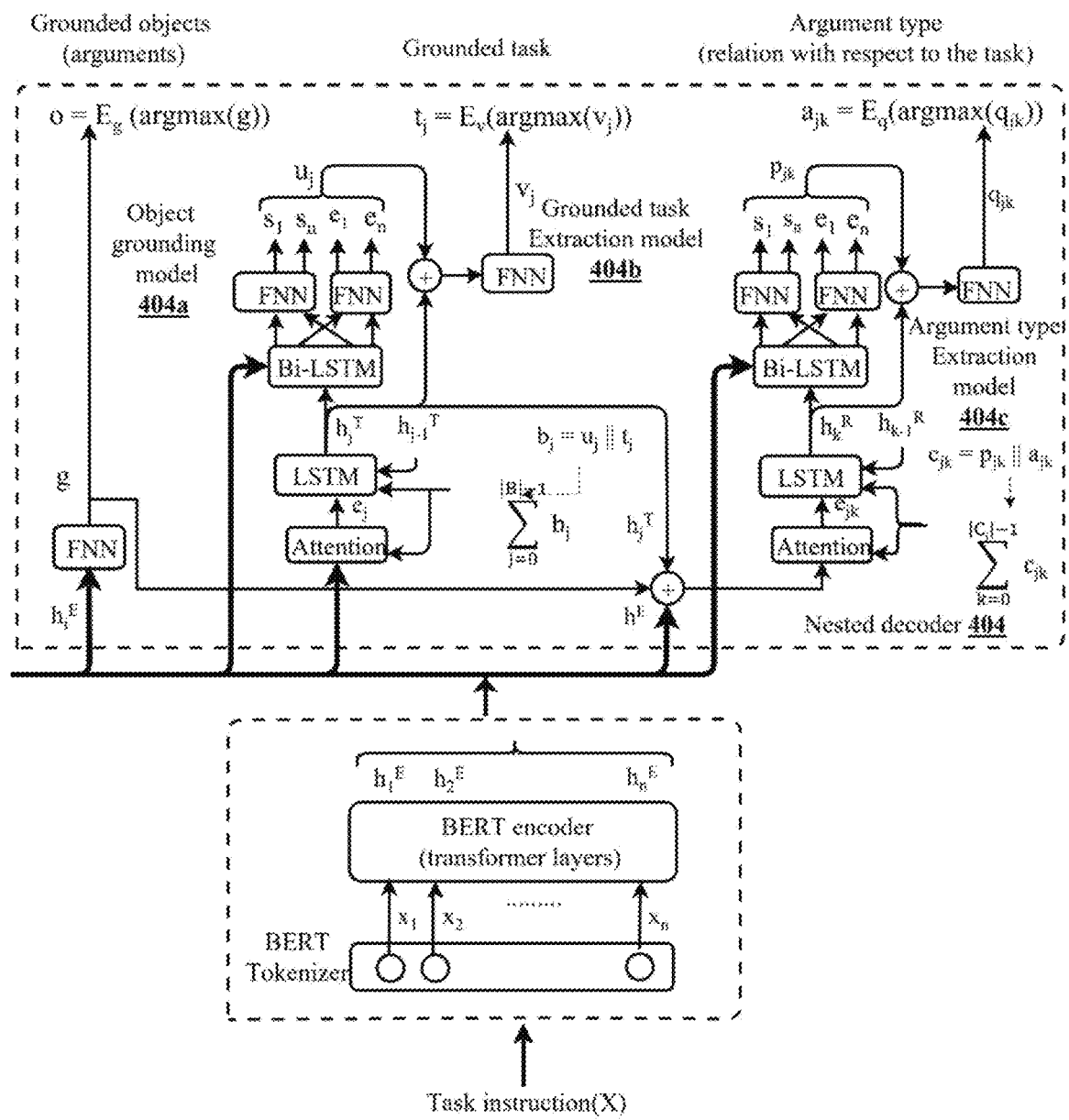
FIG. 4 is an exemplary block diagram of the encoder-decoder neural network, in accordance with some embodiments of the present disclosure.

FIG. 4 is an exemplary block diagram of the encoder-decoder neural network 400, in accordance with some embodiments of the present disclosure. As shown in the FIG. 4, the encoder-decoder neural network 400 includes an instruction encoder 402 and a nested decoder 404. The nested decoder 404 further includes an object grounding model 404a, a grounded task extraction model 404b, and an argument type extraction model 404c. The encoder-decoder neural network 400 is designed in the present disclosure in such a way to extract a list of sub-tasks and to extract a list of arguments for each sub-task. The instruction encoder 402 is used to encode the given natural language instruction. The nested decoder 404 is used for task and argument extraction. As shown in FIG. 4, the outer decoder of the nested decoder 404 is responsible to generate the task sequence and inner decoder of the nested decoder 404 is responsible to generate the argument sequence. For argument grounding.

The instruction encoder 402 and the nested decoder 404 of the encoder-decoder neural network 400 are jointly trained for these multiple tasks. The training process of the encoder-decoder neural network 400 with each training task instruction of the one or more training task instructions present in each mini-batch is explained in the below steps from 306a to 306f.

At step 306a, each training task instruction present in the mini-batch is passed to the instruction encoder 402, to obtain a plurality of encoded vectors pertaining to each training task instruction. Obtaining the plurality of encoded vectors pertaining to each training task instruction is further explained through steps 306a1 through 306a2.

At step 306a1, each training task instruction is tokenized using a pre-trained language model-based tokenizer of the instruction encoder 402, to obtain a plurality of tokens pertaining to each training task instruction. Each token of the plurality of tokens refer to one or more words (typically each token is one word) present in the training task instruction. Pre-trained bidirectional encoder representations from transformers (BERT) embeddings are used to encode the source tokens of the instructions. The source tokens are tokenized using the pre-trained language model-based tokenizer such as a pre-trained BERT tokenizer to obtain the plurality of tokens.

At step 306a2, the plurality of tokens pertaining to each training task instruction, obtained at step 306a1, is passed to a pre-trained language model-based encoder of the instruction encoder 402, to obtain the plurality of encoded vectors pertaining to each training task instruction. Each encoded vector of the plurality of encoded vectors is associated to each token of the plurality of tokens pertaining to each training task instruction. Further, each encoded vector is an encoded version of the corresponding token of the training task instruction. The plurality of tokens is passed to the pre-trained language model-based encoder such as a pre-trained BERT model to obtain the contextual encoder representation of these tokens, $h_t^E \in R^{d_h}$, where $R^{d_h}$ is the vector of real numbers of dimension $d_h$.

The arguments that refer to a physical object in the environment needs to be grounded, i.e., mapped to the object detector's vocabulary that the agent is using. At step 306b, the plurality of encoded vectors pertaining to each training task instruction, obtained at step 306a, are passed to the object grounding model 404a of the nested decoder 404, to obtain one or more grounded arguments. Each grounded argument is obtained along with a predefined grounded argument class which is among one or more predefined grounded argument classes. Each grounded argument refers to a physical object type present in a physical environment. For example, the physical objects are a cup, a table, a fridge, a red cap, and so on that are present in the physical environment, on which the embodied robot has to perform the one or more tasks.

The one or more grounded arguments are obtained by passing the plurality of encoded vectors pertaining to each training task instruction, to a first feed-forward layer of the object grounding model 404a, to classify each of the one or more grounded arguments present in the training task instruction, with the predefined grounded argument class. The classification of each of the one or more grounded arguments present in the training task instruction, with the predefined grounded argument class is achieved by a soft-max classifier of the object grounding model 404a using a Beginning Inside and Outside (BIO) sequence labelling approach.

The one or more predefined grounded argument classes refer to broad and general names that are used for naming the object. For example, a cup and a mug are considered as same objects but the general name in the natural language is a cup. So here the cup is the predefined grounded argument class that is classified for the tokens such as a cup and a mug.

The encoder vectors $h_t^E$ are passed to a feed-forward layer with soft-max activation for classifying a span to grounded objects. From this sequence labeling, the list of object spans in the instruction are obtained along with the grounded object class. Each argument span extracted by the inner argument decoder is assigned to the class type from this list (the one or more predefined grounded argument classes). In the 'BIO' tagging scheme, the total number of tags is K=3×#grounded objects. For each token in the instruction, K dimensional soft-max output vector is obtained. The vectors are used in the argument extraction network to improve the extraction process. For object (argument) grounding, the BIO sequence labeling is sufficient as even if an argument is shared in multiple tasks, it is detected as the same object by the object detector.

More specifically, the Beginning Inside and Outside (BIO) sequence labelling approach is used for object (argument) grounding and to identify the beginning and ending of each grounded arguments (or also referred as grounded objects) (for each meaningful token) present in the training task instruction. For example, if the training task instruction contains the grounded argument: a red (colored) mug, then the beginning (with index '0') is 'red' and ending is (with index '1') is 'mug', and thus the entire phrase of 'red (colored) mug' is identified as one grounded argument (one token) and such grounded argument is classified with the predefined grounded argument class as a cup using the soft-max classifier.

In another example, if the training task instruction contains the grounded argument: 'mug', then the beginning (with index '0') is 'mug' and ending is (with index 'o') is also 'mug', and thus the phrase 'mug' is identified as one grounded argument (one token) and such grounded argument is classified with the predefined grounded argument class as a cup using the soft-max classifier. The output of the step 306b are the one or more grounded arguments and the one or more predefined grounded argument classes that are relevant to the plurality of tokens (obtained at step 306a1) present in each training task instruction.

At step 306c, the plurality of encoded vectors pertaining to each training task instruction, obtained at step 306b, are passed to the grounded task extraction model 404b of the nested decoder 404, to extract one or more grounded sub-tasks in a form of a task sequence, pertaining to each training task instruction. As the training task instruction is a complex task instruction, the whole training task instruction is divided into the one or more grounded sub-tasks at this step. The one or more grounded sub-tasks here refer to the one or more sub-tasks that are related to the physical objects (grounded arguments). The one or more grounded sub-tasks are sequenced in the form of the task sequence to complete by the task instruction.

Extracting the one or more grounded sub-tasks from each training task instruction is further explained through steps 306c1 to 306c6. At step 306c1, the plurality of encoded vectors pertaining to each training task instruction, are passed to a first attention network of the grounded task extraction model 404b, to generate one or more context vectors pertaining to each training task instruction. Each context vector refers to each grounded sub-task present in the training task instruction.

At step 306c2, the context vector associated to each grounded sub-task of the one or more grounded sub-tasks, is passed to a first long short-term memory (LSTM) network of the grounded task extraction model 404b, to generate a plurality of task hidden vectors of each grounded sub-task. At step 306c3, (i) the plurality of encoded vectors obtained at step 306a of the method 300 pertaining to each training task instruction, and (ii) the plurality of task hidden vectors obtained at step 306c2 of the method 300, of each grounded sub-task, pertaining to the corresponding training task instruction, are concatenated, to obtain a plurality of concatenated task hidden vectors for each grounded sub-task, pertaining to each training task instruction.

At step 306c4, the plurality of concatenated task hidden vectors of each grounded sub-task, obtained at step 306c3, pertaining to each training task instruction, are passed to a first span detection network of the grounded task extraction model 404b, to generate a task span of each grounded sub-task. The task span defines a beginning index and an end index of grounded sub-task present in the training task instruction. For this, each token of the plurality of tokens are assigned with index starting with '0' in the ascending order and the index of the last token defines the number of tokens present in the corresponding training task instruction.

At step 306c5, (i) the plurality of task hidden vectors obtained at step 306c2 of the method 300, and (ii) the task span obtained at step 306c4, of each grounded sub-task, are concatenated, to obtain a plurality of concatenated span mark task hidden vectors of each grounded sub-task.

At the last step 306c6, the plurality of concatenated span mark task hidden vectors of each grounded sub-task, obtained at step 306c5, are passed, to a second feed-forward layer of the grounded task extraction model 404b, to classify each of the one or more grounded sub-tasks, with a predefined grounded task class, by a soft-max classifier of the grounded task extraction model 404b. The predefined grounded task class is one among the one or more predefined grounded task classes which refer to broad task class type including do, {pick, take, grab}, place, pour, and so on.

In an embodiment, the grounded task extraction model 404b is an LSTM-based auto-regressive decoder for generating the task sequence. At every time step j of the task decoding, the decoder LSTM receives an overall representation of encoder context $e_j \in \mathbb{R}^{d_h}$, and representation of the previously generated tasks $(\Sigma_{j=0}^{|B|-1} b_j)$ as input. The encoder context representation $e_j$ is obtained using an attention mechanism on encoder hidden states $h_i^E$. At the first decoding step, $b_0$ is taken as a zero vector, and the subsequent task vectors $b_j$'s are obtained after each decoding step. Task decoder LSTM outputs the task hidden vector $h_j^T \in \mathbb{R}^{d_h}$. This hidden representation is concatenated with the hidden representations $h_i^E$ of the encoder and passed to a span detection module to mark the start and end token of the task description. After one task is extracted, the inner decoder (argument decoder) receives the task hidden vector $h_j^T$ and starts generating the argument sequence for this task. Once all the arguments of this task are generated, this outer task decoder moves on to generate the next task.

At step 306d, each grounded sub-task of the one or more grounded sub-tasks extracted by the grounded task extraction model 404b at step 306c of the method 300, are passed to the argument type extraction model 404c of the nested decoder 404, to (i) extract one or more arguments for each grounded sub-task, and (ii) map each argument with the predefined grounded argument class obtained at step 306b of the method 300. Extracting the one or more arguments for each grounded sub-task and mapping each argument with the predefined grounded argument class is further explained through steps 306d1 to 306d7.

At step 306d, each grounded sub-task of the one or more grounded sub-tasks extracted by the grounded task extraction model 404b at step 306c, is passed to the argument type extraction model 404c of the nested decoder 404, to extract one or more arguments for the corresponding grounded sub-task. Also, to map each argument with the predefined grounded argument class identified at step 306b. The extraction of the one or more arguments for the corresponding grounded sub-task and mapping each argument with the predefined grounded argument class is further explained through steps 306d1 to 306d7.

At step 306d1, the plurality of encoded vectors obtained at step 306a of the method 300, the plurality of task hidden vectors generated at step 306c2, and the one or more grounded arguments obtained at step 306b, of each grounded sub-task, are concatenated to obtain a plurality of concatenated result vectors, for each grounded sub-task. At step 306d2, the plurality of concatenated result vectors of each grounded sub-task, obtained at step 306d1, are passed to a second attention network of the argument type extraction model 404c, to obtain one or more encoded context vectors of each grounded sub-task.

At step 306d3, each of the one or more encoded context vectors of each grounded sub-task obtained at step 306d2, are passed to a second LSTM network of the argument type extraction model 404c, to generate a plurality of argument hidden vectors for each encoded context vector.

At step 306d4, the plurality of argument hidden vectors for each encoded context vector generated at step 306d3 and the plurality of encoded vectors pertaining to the training task instruction, are concatenated, to obtain a plurality of concatenated argument hidden vectors, for each encoded context vector. At step 306d5, the plurality of concatenated argument hidden vectors, for each encoded context vector, obtained at step 306d4, are passed to a second span detection network of the argument type extraction model 404c, to generate an argument span for each encoded context vector. The argument span for each encoded context vector is generated in the similar fashion of the task span described at step 306c4.

At step 306d6, the plurality of argument hidden vectors generated at step 306d3 and the argument span generated at step 306d5, for each encoded context vector, are concatenated, to obtain concatenated span mark argument hidden vectors of each encoded context vector. At step 306d7, the concatenated span mark argument hidden vectors of each encoded context vector, are passed to a third feed-forward layer of the argument type extraction model 404c, to classify each encoded context vector, by a soft-max classifier of the argument type extraction model, to extract the one or more arguments for each grounded sub-task. Each argument is then mapped with the predefined grounded argument class of the one or more predefined grounded argument classes identified at step 306b.

In an embodiment, the grounded task extraction model 404b is a similar LSTM-based autoregressive decoder used in the task decoding, for extracting the arguments. For the extracted task $t_j$, at every time step k of the argument decoding process, the argument decoder LSTM receives the task representation vector $h_j^T$, encoder context $e_{jk}$ vectors, and all the previously generated arguments for this task $(\Sigma_{k=0}^{|c_j|-1} c_{jk})$. As before, $c_{j0}$ is a zero vector, and the subsequent argument vectors are obtained after each argument decoding step. The encoder context representation $e_{jk}$ is obtained using an attention mechanism on the concatenated vectors of encoder hidden states $h_i^E$ and task hidden vector $h_j^T$. This decoder LSTM outputs the hidden representation of an argument $h_k^A \in R^{d_h}$. Then, the $h_k^A$ is concatenated with the encoder vectors $h_i^E$ and passed to a span detection module to identity the start and end of the argument and classify the type of the argument. Once all the argument for a task is generated, control returns to the outer task decoder to generate the next task.

The task and argument description spans are identified in the instruction using their start and end tokens. Two different span detection modules (the first span detection network and the second span detection network) for task and argument span identification. But the design of these two modules is similar in nature. They have a bi-directional long short-term memory (BILSTM) layer with two feed-forward layers with soft-max activation. The task hidden vector $h_j^T$ or argument hidden vector $h_k^A$ are concatenated with the encoder vectors $h_i^E$ and pass it to the BILSTM layer. The output of the BILSTM layer is passed to a feed-forward layer to convert each hidden representation to a scalar score. A scalar score corresponding to each token in the instruction is obtained. The soft-max activation is applied across these scalar scores to normalize them. The corresponding token with the highest normalized score is marked as the start token of a span. Similarly, another feed-forward layer with soft-max activation is used to mark the end token of the span. The vector representations of these spans ($u_j$ or $p_{jk}$) are obtained using the normalized scores and BILSTM outputs.

Next, $u_j$ and $h_j^T$ are concatenated and passed to a feed-forward layer with soft-max to classify the task type ($v_j$). The $v_j$ and a task type embedding ($E_v$) layer are used to get the task type vector $t_j$. Further, the vector representation of the task $b_j$ is obtained by concatenating $u_j$ and $t_j$. Similarly, the argument type ($a_{jk}$) is classified to obtain the vector representation of the argument $c_{jk}$.

At step 306e, a value of a loss function of the encoder-decoder neural network 400, for each mini-batch, is calculated. The encoder-decoder neural network 400 is trained in mini-batches of size B for multiple epochs and the model parameters are updated using the loss function which is a negative log-likelihood loss and using a gradient descent-based optimizer AdamW. First the value of the loss function of the encoder-decoder neural network 400 for each training task instruction computed, and then all the values are summed up to obtain the loss function of the encoder-decoder neural network 400, for entire mini-batch.

The loss function of the encoder-decoder neural network 400 is calculated based on (i) a loss function of the object grounding model 404a, (ii) a loss function of the grounded task extraction model 404b, and (iii) a loss function of the argument type extraction model 404c. More particularly, the loss function of the encoder-decoder neural network 400 is a sum of (i) the loss function of the object grounding model 404a, (ii) the loss function of the grounded task extraction model 404b, and (iii) the loss function of the argument type extraction model 404c.

The loss function ($\mathcal{L}$) of the encoder-decoder neural network 400 for a mini-batch of size M, is mathematically represented as in equation 1:

$$\mathcal{L} = \frac{1}{M} \sum_{m=1}^{M} [\mathcal{L}_t + \mathcal{L}_a + \mathcal{L}_g] \quad (1)$$

Wherein $\mathcal{L}_t$ is the loss function of the grounded task extraction model 404b, $\mathcal{L}_a$ is the loss function of the argument type extraction model 404c, and $\mathcal{L}_g$ is the loss function of the object grounding model 404a.

The loss function ($\mathcal{L}_t$) of the grounded task extraction model 404b is mathematically represented as in equation 2:

$$\mathcal{L}_t = -\frac{1}{|B|} \sum_{j=1}^{|B|} [\ln(s_j) + \ln(e_j) + \ln(c_j)] \quad (2)$$

Wherein s and e are the soft-max outputs of the corresponding gold-label start and end positional index of the task span and c is the soft-max output of the gold-label task type.

The loss function ($\mathcal{L}_a$) of the argument type extraction model 404c is mathematically represented as in equation 3:

$$\mathcal{L}_a = -\frac{1}{\sum_{j=1}^{|B|} |c_j|} \sum_{j=1}^{|B|} \sum_{k=1}^{|C_j|} [\ln(s_{jk}) + \ln(e_{jk}) + \ln(r_{jk})] \quad (3)$$

Wherein s and e are the soft-max outputs of the corresponding gold-label start and end positional index of the argument span and r is soft-max output of the gold-label argument type.

The loss function ($\mathcal{L}_g$) of the object grounding model 404a is mathematically represented as in equation 4:

$$\mathcal{L}_g = -\frac{1}{n} \sum_{i=1}^{n} \ln(g_i) \quad (4)$$

wherein g is soft-max output of the gold-label tag for the i-th token in the instruction.

At step 306f, one or more network parameters (also referred as weights) of the encoder-decoder neural network 400, are updated based on the value of the loss function of the encoder-decoder neural network 400, for training with a next mini-batch. Like this, the training process of the encoder-decoder neural network 400 is performed until the one or more mini-batches are completed. After the completion of the training process, the task and argument extraction model are obtained which can be deployed in the embodied robot, for the task and argument extraction from the natural task instructions in the real-time.

At step 308 of the method 300, the one or more hardware processors 104 of the system 100 are configured to receive a real-time task instruction for the embodied robot from a subject. The real-time task instruction refers to the task instruction received by the embodied robot configured to perform certain tasks in the physical environment. As described at step 302 of the method 300, the real-time task instruction is the natural language textual input from the subject.

At step 310 of the method 300, the one or more hardware processors 104 of the system 100 are configured to pass the real-time task instruction, to the task and argument extraction model, to extract (i) the one or more grounded arguments, (ii) the one or more grounded sub-tasks in the form of the task sequence, and (iii) the one or more arguments along with associated predefined grounded argument classes, for the embodied robot to complete the real-time task instruction. The one or more grounded arguments, the one or more grounded sub-tasks, and the one or more arguments for each grounded sub-task are extracted in the similar fashion of how the encoder-decoder neural network 400 is trained at step 306.

During training, the end of sequence 'EOS' task and 'EOS' argument is included at the end of their sequences and let the encoder-decoder neural network 400 learn to stop extraction of tasks/arguments. At the inference time, both the grounded task extraction model 404b and the argument type extraction model 404c are executed for a maximum number of steps but ignore any tasks/arguments extracted after the 'EOS'. During inference, a greedy approach is followed to select the start and end tokens of the task or argument spans. The start and end are selected where the product of the two probabilities is maximum, and the end token does not appear before the start token. Table 1 shows the parameter settings used to train the encoder-decoder neural network 400.

TABLE 1

| Batch size | 16 |
| Optimizer | AdamW |
| Learning rate | 0.0001 |
| # Epochs | 100 |
| Early stop count | 20 |

Hence the methods and systems of the present disclosure implement the Grounded Argument and Task Extraction (GATE) technique for extracting a set of sub-tasks from the compound task instructions in natural languages efficiently. The GATE uses the encoder-decoder neural network with nested decoding to extract the tasks and their associated arguments from the instruction. The extracted tasks are mapped (grounded) to the known skill set of the robot and arguments are mapped (grounded) to objects within the environment. The encoder-decoder neural network of the present disclosure classifies the tokens as many times as possible which the conventional sequence labeling cannot do, and in the present disclosure the same tokens are classified multiple times (i.e., shared task and argument).
Example Scenario:

The dataset, parameter settings, and evaluation metrics that are used to train the encoder-decoder neural network 400, and evaluate the task and argument extraction model are described below:

Data set: A new dataset is annotated for the experiments. The dataset is built by extending the natural language instruction sentences from two robotic commands datasets. Table 2 shows a current set of task types. The task types are also adapted from robotic task datasets. The first two tasks are not real task types, but often appear in robotic task instruction and need to be processed for understanding the other tasks. Though the dataset is adapted from the existing ones, the annotation is significantly different to suit the purpose. This consists of the following features—(i) the token span of the set of sub-tasks in the instruction along with their grounded types, (ii) the set of arguments associated with each task along with the token span and the argument type, (iii) provision of sharing an argument by multiple tasks, (iv) provision of classifying a token multiple times, (v) resolution of co-reference of objects, and (vi) argument grounding considering the object classes of the underlying object detector.

TABLE 2

| Task type | Example instruction |
|---|---|
| Being_located | the cup is on the table |
| Being_in_category | this is a living room with green curtains |
| Bringing | bring me a cup from the table |
| Change_operational_state | turn on the television |
| Check_state | Please check if the stereo is on |
| Closure | Close the cabinet |
| Cutting | Cut the apple on the dining table |
| Following | Follow the person in red shirt |
| Giving | robot can you pass me a plate |
| Inspecting | Look down on the floor |
| Motion | Go near the window |
| Picking | Take the bottle from the bedside table |
| Placing | put the bottle in the trash |
| Searching | Find me the red shirt |
| Turning | Turn to your left |

FIG. 5 is an exemplary annotation schema of an exemplary natural language task instruction, in accordance with some embodiments of the present disclosure. As any task type or argument type can be represented by multiple tokens in the input, each type is annotated with a start and end token. For example, the 'Source' of the cup is denoted by two tokens 'dining table', which is marked by the start and end token index 6 and 7, respectively. There are three sub-tasks in the example—'Being located', 'Picking', and placing. Each sub-task and its corresponding arguments form a substructure, which is separated by a vertical line as shown in the example. Within each substructure, the first element always denotes the sub-task, which is followed by the arguments and separated by semicolons. Additionally, each element has three components-start token index, end token index, and type of this token span (task/argument type).

Since there is a separate substructure for each sub-task, a particular token span indicating a particular argument can be shared by multiple sub-tasks. For FIG. 5, the 'theme' argument is shared by all three sub-tasks, and the 'Source' argument is shared by two sub-tasks. Additionally, this annotation scheme supports a shared argument to be classified differently for different sub-tasks. Similarly, a token or token span can be classified multiple times as different classes, e.g., token 15 is classified as 'Goal' and 'Containing object' is sub-task 'Placing'. The idea behind multiple classifications is to provide additional information to the task planner.

A separate annotation is done for argument grounding from an object detector's point of view. If the object classes are changed (in particular, the vocabulary set), then the annotation has to be changed accordingly. But a separate annotation ensures that the annotation for the task and argument type remains fixed even if the argument grounding annotation is changed. Since an object detector would always recognize an object by the same name, irrespective of it being treated as a different argument type for tasks, onetime prediction is sufficient. Thus, the argument grounding is annotated as a sequence labeling job using the BIO tagging scheme. The BIO tag for the tokens is shown in FIG. 5.

Once prepared, the data was first proportionately divided to fit the training, development, and testing sets with 1120, 110, and 520 inputs, respectively. Though the dataset is not balanced in terms of the number of task types, while splitting, it is ensured that the distribution of the task types is similar in each of the splits. Also, there is a balance of single sub-task and multiple-subtask inputs. Additionally, the test set is carefully selected such that there is less than 60% overall in the input as compared to the train and development set. Table 3 shows the number of inputs with single and multiple sub-tasks across the three splits.

TABLE 3

| | Total inputs | Single task | Multi tasks |
|---|---|---|---|
| Train split | 1120 | 723 | 397 |
| Development split | 110 | 74 | 36 |
| Test split | 520 | 355 | 165 |

Evaluation Metric: the performance of the task and argument extraction model of the present disclosure is defined using a strict F1 score, which is the harmonic mean of the precision and recall of our classifier as the metric definition. To that effect, a missing subtask or attribute label is considered to be negative which means that in the case of no detection or in the case of the wrong classification, the metric takes the prediction as 'wrong'. Conversely, only on a correct label match, it takes the metric as correct. Every hit and every miss are recorded in a confusion matrix where it is populated for all types of tasks and all attributes with 'None' being the record for the misses of a given task or attribute. Thereafter the confusion matrices are used to calculate the precision and the recall for the particular task or attribute classes. Additionally, a combined F1 score is also generated as an overall metric for the baseline comparisons that take into account both the task and attribute combinations together.

Evaluation: To evaluate the performance of the task and argument extraction model of the present disclosure, a number of baseline techniques are defined for the comparison. The first baseline is proposed by Pramanick et al. where they have used a conditional random fields (CRF)-based model for task and argument extraction. Essentially, the model works as a sequence labeling job. Apart from lower accuracy in task and argument prediction, such a model (sequence labeling) cannot—(i) classify the shared task/argument, (ii) reclassify token(s), and (iii) resolve coreference. The next baseline is a pre-trained BERT model and a fully connected layer as a classification head on top. The performance of Feature CRF and BERT baseline is very similar. Then, these two approaches are combined, i.e., instead of using a pre-trained token embedding (like Feature CRF), the BERT used as the encoder layer and the CRF as the classification layer. Though this BERT CRF performs better as compared to the Feature CRF or BERT model, it again emits the behavior of sequence labeling.

As mentioned earlier, the encoder-decoder neural network 400 follows a generative approach to tackle the limitations of the existing methods. The performance gain is evident from Table 4. The combined F1 score is calculated considering all the sub-tasks and the corresponding arguments in an input. As the argument grounding is separately annotated, this training can be done separately. Two sets are considered for the training-one with the argument grounding training as a separate job, and another with a joint job of argument grounding and task & argument type prediction. The experiment shows that joint training performs much better than separate training.

TABLE 4

| Method | Score without arg grounding | | | Score with arg grounding | | |
| --- | --- | --- | --- | --- | --- | --- |
| | precision | recall | F1 | precision | recall | F1 |
| Feature CRF | 0.775 | 0.736 | 0.754 | 0.666 | 0.638 | 0.648 |
| BERT | 0.805 | 0.717 | 0.758 | 0.697 | 0.621 | 0.657 |
| BERT CRF | 0.834 | 0.732 | 0.780 | 0.721 | 0.633 | 0.674 |
| Encoder-decoder neural network 400 (separately trained arg grounding) | 0.871 | 0.838 | 0.854 | 0.678 | 0.606 | 0.640 |
| Encoder-decoder neural network 400 (jointly trained arg grounding) | 0.868 | 0.844 | 0.856 | 0.766 | 0.737 | 0.751 |

For ablation, different types of BERT encoders are considered. Though all types of BERT models use a number of stacked transformer layers to get a vector representation of natural language input, the variation stems from the number of transformer layers and dimension of the output vectors. Presently 5 different variations have been experimented—(i) mini with 4 layers and 256-dimensional vector, (ii) small with 4 layers and 512-dimensional vector, (iii) medium with 8 layers and 512-dimensional vector, (iv) base uncased with 12 layers and 786-dimensional vector, and (v) large uncased with 24 layers and 1024-dimensional vector. The pre-trained models for the variations of BERT are provided by Turc et al. A small number of layers and vector dimensions leads to lesser number of parameters, a smaller model size, and a smaller training & inference time. However, this impacts the accuracy of the system as evident in Table 5. With a larger encoder network, the performance of the Encoder-decoder neural network 400 of the present disclosure keeps increasing with some saturation point. The large BERT model, even though it has a much larger network, is unable to outperform the BERT base model. Thus, the Encoder-decoder neural network 400 is fixated with the BERT base model as the encoder.

TABLE 5

| BERT Encoder | Total number of parameters | Model size | Training time per epoch | Inference time | F1 (without arg grounding) | F1 (with jointly trained arg grounding) | F1 (with separately trained arg grounding) |
| --- | --- | --- | --- | --- | --- | --- | --- |
| mini | 17.5M | 66.9 MB | 7.9 s | 76.3 ms | 0.826 | 0.723 | 0.709 |
| small | 44.8M | 171.1 MB | 8.5 s | 76.6 ms | 0.840 | 0.741 | 0.710 |
| medium | 57.5M | 219.2 MB | 9.6 s | 79.7 ms | 0.844 | 0.743 | 0.717 |
| base uncased | 139.2M | 531.1 MB | 13.3 s | 86.7 ms | 0.856 | 0.751 | 0.728 |
| large uncased | 382.4M | 1.42 GB | 23.0 s | 95.8 ms | 0.847 | 0.744 | 0.714 |

Figure 6A:
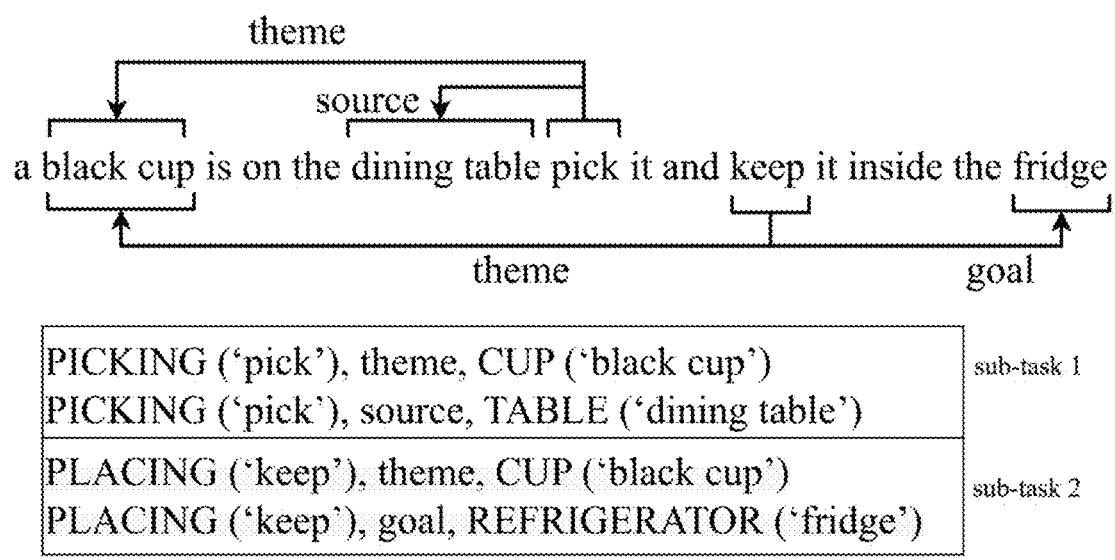
FIGS. 6A and 6B, show the extraction of the sub-tasks and the arguments for the exemplary task instructions of FIGS. 1B and 1C, in accordance with some embodiments of the present disclosure.
Figure 6B:
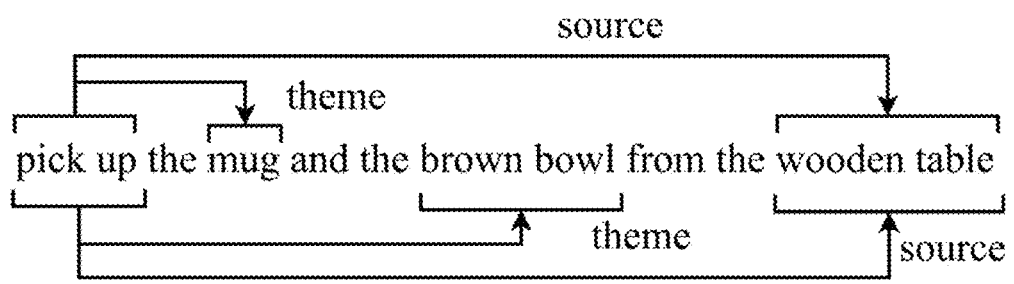

FIGS. 6A and 6B, show the extraction of the sub-tasks and the arguments for the exemplary task instructions of FIGS. 1B and 1C, in accordance with some embodiments of the present disclosure. As shown in FIG. 6A, two sub-tasks with multiple arguments and a common argument, are extracted using the task and argument extraction model of the present disclosure. Similarly in FIG. 6B, two sub-tasks with the common task phrase and a common argument are extracted, using the task and argument extraction model of the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of understanding the natural language and extracting the tasks for the robots, using the novel deep neural network architecture, called Grounded Argument and Task Extraction (GATE) that extracts the set of tasks and their relevant arguments from the complex natural language instruction. The GATE follows the encoder-decoder neural network architecture, where the decoder follows a layered structure to extract the relevant information.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising the steps of:
   receiving, via one or more hardware processors, a training dataset comprising a plurality of training task instructions, wherein each training task instruction of the plurality of training task instructions is a natural language textual input;
   forming, via the one or more hardware processors, one or more mini-batches from the plurality of training task instructions present in the training dataset, based on a mini-batch size, wherein each mini-batch comprises one or more training task instructions out of the plurality of training task instructions and wherein a number of the one or more training task instructions present in each mini-batch is determined based on the mini-batch size; and
   training, via the one or more hardware processors, an encoder-decoder neural network, with the one or more training task instructions present in each mini-batch a time, until the one or more mini-batches are completed to obtain a task and argument extraction model utilized for an embodied robot, wherein the encoder-decoder neural network comprises an instruction encoder and a nested decoder, wherein the nested decoder comprises an object grounding model, a grounded task extraction model, and an argument type extraction model, and wherein training the encoder-decoder neural network with each training task instruction present in each mini-batch comprises:
      passing each training task instruction to the instruction encoder, to obtain a plurality of encoded vectors pertaining to each training task instruction;
      passing the plurality of encoded vectors pertaining to each training task instruction, to the object grounding model of the nested decoder, to obtain one or more grounded arguments along with a predefined grounded argument class of one or more predefined grounded argument classes for each grounded argument, wherein each grounded argument refers to a physical object type present in a physical environment;
      passing the plurality of encoded vectors pertaining to each training task instruction, to the grounded task extraction model of the nested decoder, to extract one or more grounded sub-tasks in a form of a task sequence, pertaining to each training task instruction;
      passing each grounded sub-task of the one or more grounded sub-tasks extracted by the grounded task extraction model, to the argument type extraction model of the nested decoder, to (i) extract one or more arguments for each grounded sub-task, and (ii) map each argument with the predefined grounded argument class;
      calculating a value of a loss function of the encoder-decoder neural network, for each mini-batch, wherein the loss function of the encoder-decoder neural network is calculated based on (i) a loss function of the object grounding model, (ii) a loss function of the grounded task extraction model, and (iii) a loss function of the argument type extraction model; and
      updating one or more network parameters of the encoder-decoder neural network, based on the value of the loss function of the encoder-decoder neural network, for training with a next mini-batch.

2. The processor-implemented method of claim 1, wherein passing each training task instruction to the instruction encoder, to obtain the plurality of encoded vectors pertaining to each training task instruction, comprises:
- tokenizing each training task instruction using a pre-trained language model-based tokenizer of the instruction encoder, to obtain a plurality of tokens pertaining to each training task instruction; and
- passing the plurality of tokens pertaining to each training task instruction, to a pre-trained language model-based encoder of the instruction encoder, to obtain the plurality of encoded vectors pertaining to each training task instruction, wherein each encoded vector of the plurality of encoded vectors is associated to each token of the plurality of tokens pertaining to each training task instruction.

3. The processor-implemented method of claim 1, wherein passing the plurality of encoded vectors pertaining to each training task instruction, to the object grounding model of the nested decoder, to obtain the one or more grounded arguments along with the predefined grounded argument class of the one or more predefined grounded argument classes for each grounded argument, comprises: passing the plurality of encoded vectors pertaining to each training task instruction, to a first feed-forward layer of the object grounding model, to classify each of the one or more grounded arguments, with the predefined grounded argument class, by a soft-max classifier of the object grounding model using a Beginning Inside and Outside (BIO) sequence labelling approach.

4. The processor-implemented method of claim 1, wherein passing the plurality of encoded vectors pertaining to each training task instruction, to the grounded task extraction model of the nested decoder, to extract the one or more grounded sub-tasks in the form of the task sequence, pertaining to each training task instruction, comprises:
- passing the plurality of encoded vectors pertaining to each training task instruction, to a first attention network of the grounded task extraction model, to generate a context vector of each grounded sub-task of the one or more sub-tasks;
- passing the context vector of each grounded sub-task of the one or more grounded sub-tasks, to a first long short-term memory (LSTM) network of the grounded task extraction model, to generate a plurality of task hidden vectors of each grounded sub-task;
- concatenating (i) the plurality of encoded vectors and (ii) the plurality of task hidden vectors, of each grounded sub-task, pertaining to each training task instruction, to obtain a plurality of concatenated task hidden vectors for each grounded sub-task, pertaining to each training task instruction;
- passing the plurality of concatenated task hidden vectors of each grounded sub-task, pertaining to each training task instruction, to a first span detection network of the grounded task extraction model, to generate a task span of each grounded sub-task;
- concatenating (i) the plurality of task hidden vectors and (ii) the task span, of each grounded sub-task, to obtain a plurality of concatenated span mark task hidden vectors of each grounded sub-task; and
- passing the plurality of concatenated span mark task hidden vectors of each grounded sub-task, to a second feed-forward layer of the grounded task extraction model, to classify each of the one or more grounded sub-tasks, with a predefined grounded task class, by a soft-max classifier of the grounded task extraction model.

5. The processor-implemented method of claim 1, wherein passing each grounded sub-task of the one or more grounded sub-tasks extracted by the grounded task extraction model, to the argument type extraction model of the nested decoder, to (i) extract the one or more arguments for each grounded sub-task, and (ii) map each argument with the predefined grounded argument class, comprises:
- concatenating (i) the plurality of encoded vectors, (ii) the plurality of task hidden vectors, and (iii) the one or more grounded arguments, of each grounded sub-task, to obtain a plurality of concatenated result vectors, for each grounded sub-task;
- passing the plurality of concatenated result vectors of each grounded sub-task, to a second attention network of the argument type extraction model, to obtain one or more encoded context vectors of each grounded sub-task;
- passing each of the one or more encoded context vectors of each grounded sub-task, to a second LSTM network of the argument type extraction model, to generate a plurality of argument hidden vectors for each encoded context vector;
- concatenating (i) the plurality of argument hidden vectors for each encoded context vector and (ii) the plurality of encoded vectors pertaining to the training task instruction, to obtain a plurality of concatenated argument hidden vectors, for each encoded context vector;
- passing the plurality of concatenated argument hidden vectors, for each encoded context vector, to a second span detection network of the argument type extraction model, to generate an argument span for each encoded context vector;
- concatenating (i) the plurality of argument hidden vectors and (ii) the argument span, for each encoded context vector, to obtain concatenated span mark argument hidden vectors of each encoded context vector; and
- passing the concatenated span mark argument hidden vectors of each encoded context vector, to a third feed-forward layer of the argument type extraction model, to classify each encoded context vector, by a soft-max classifier of the argument type extraction model, to (i) extract the one or more arguments for each grounded sub-task, and (ii) map each argument with the predefined grounded argument class.

6. The processor-implemented method of claim 1, further comprising:
- receiving, via the one or more hardware processors, a real-time task instruction for the embodied robot configured to perform in the physical environment, from a subject, wherein the real-time task instruction is the natural language textual input; and
- passing, via the one or more hardware processors, the real-time task instruction, to the task and argument extraction model, to extract (i) the one or more grounded arguments, (ii) the one or more grounded sub-tasks in the form of the task sequence, and (iii) the one or more arguments along with associated predefined grounded argument classes, for the embodied robot to complete the real-time task instruction.

7. A system comprising:
a memory storing instructions;
one or more input/output (I/O) interfaces; and
one or more hardware processors coupled to the memory via the one or more I/O interfaces, wherein the one or more hardware processors are configured by the instructions to:
receive a training dataset comprising a plurality of training task instructions, wherein each training task instruction of the plurality of training task instructions is a natural language textual input;
form one or more mini-batches from the plurality of training task instructions present in the training dataset, based on a mini-batch size, wherein each mini-batch comprises one or more training task instructions out of the plurality of training task instructions and wherein a number of the one or more training task instructions present in each mini-batch is determined based on the mini-batch size; and
train an encoder-decoder neural network, with the one or more training task instructions present in each mini-batch a time, until the one or more mini-batches are completed to obtain a task and argument extraction model utilized for an embodied robot, wherein the encoder-decoder neural network comprises an instruction encoder and a nested decoder, wherein the nested decoder comprises an object grounding model, a grounded task extraction model, and an argument type extraction model, and wherein training the encoder-decoder neural network with each training task instruction present in each mini-batch comprises:
passing each training task instruction to the instruction encoder, to obtain a plurality of encoded vectors pertaining to each training task instruction;
passing the plurality of encoded vectors pertaining to each training task instruction, to the object grounding model of the nested decoder, to obtain one or more grounded arguments along with a predefined grounded argument class of one or more predefined grounded argument classes for each grounded argument, wherein each grounded argument refers to a physical object type present in a physical environment;
passing the plurality of encoded vectors pertaining to each training task instruction, to the grounded task extraction model of the nested decoder, to extract one or more grounded sub-tasks in a form of a task sequence, pertaining to each training task instruction;
passing each grounded sub-task of the one or more grounded sub-tasks extracted by the grounded task extraction model, to the argument type extraction model of the nested decoder, to (i) extract one or more arguments for each grounded sub-task, and (ii) map each argument with the predefined grounded argument class;
calculating a value of a loss function of the encoder-decoder neural network, for each mini-batch, wherein the loss function of the encoder-decoder neural network is calculated based on (i) a loss function of the object grounding model, (ii) a loss function of the grounded task extraction model, and (iii) a loss function of the argument type extraction model; and
updating one or more network parameters of the encoder-decoder neural network, based on the value of the loss function of the encoder-decoder neural network, for training with a next mini-batch.

8. The system of claim 7, wherein the one or more hardware processors are configured to pass each training task instruction to the instruction encoder, to obtain the plurality of encoded vectors pertaining to each training task instruction, by:
tokenizing each training task instruction using a pre-trained language model-based tokenizer of the instruction encoder, to obtain a plurality of tokens pertaining to each training task instruction; and
passing the plurality of tokens pertaining to each training task instruction, to a pre-trained language model-based encoder of the instruction encoder, to obtain the plurality of encoded vectors pertaining to each training task instruction, wherein each encoded vector of the plurality of encoded vectors is associated to each token of the plurality of tokens pertaining to each training task instruction.

9. The system of claim 7, wherein the one or more hardware processors are configured to pass the plurality of encoded vectors pertaining to each training task instruction, to the object grounding model of the nested decoder, to obtain the one or more grounded arguments along with the predefined grounded argument class of the one or more predefined grounded argument classes for each grounded argument, by: passing the plurality of encoded vectors pertaining to each training task instruction, to a first feed-forward layer of the object grounding model, to classify each of the one or more grounded arguments, with the predefined grounded argument class, by a soft-max classifier of the object grounding model using a Beginning Inside and Outside (BIO) sequence labelling approach.

10. The system of claim 7, wherein the one or more hardware processors are configured to pass the plurality of encoded vectors pertaining to each training task instruction, to the grounded task extraction model of the nested decoder, to extract the one or more grounded sub-tasks in the form of the task sequence, pertaining to each training task instruction, by:
passing the plurality of encoded vectors pertaining to each training task instruction, to a first attention network of the grounded task extraction model, to generate a context vector of each grounded sub-task of the one or more sub-tasks;
passing the context vector of each grounded sub-task of the one or more grounded sub-tasks, to a first long short-term memory (LSTM) network of the grounded task extraction model, to generate a plurality of task hidden vectors of each grounded sub-task;
concatenating (i) the plurality of encoded vectors and (ii) the plurality of task hidden vectors, of each grounded sub-task, pertaining to each training task instruction, to obtain a plurality of concatenated task hidden vectors for each grounded sub-task, pertaining to each training task instruction;
passing the plurality of concatenated task hidden vectors of each grounded sub-task, pertaining to each training task instruction, to a first span detection network of the grounded task extraction model, to generate a task span of each grounded sub-task;
concatenating (i) the plurality of task hidden vectors and (ii) the task span, of each grounded sub-task, to obtain a plurality of concatenated span mark task hidden vectors of each grounded sub-task; and
passing the plurality of concatenated span mark task hidden vectors of each grounded sub-task, to a second feed-forward layer of the grounded task extraction model, to classify each of the one or more grounded sub-tasks, with a predefined grounded task class, by a soft-max classifier of the grounded task extraction model.

11. The system of claim 7, wherein the one or more hardware processors are configured to pass each grounded sub-task of the one or more grounded sub-tasks extracted by the grounded task extraction model, to the argument type extraction model of the nested decoder, to (i) extract the one or more arguments for each grounded sub-task, and (ii) map each argument with the predefined grounded argument class, comprises:
  concatenating (i) the plurality of encoded vectors, (ii) the plurality of task hidden vectors, and (iii) the one or more grounded arguments, of each grounded sub-task, to obtain a plurality of concatenated result vectors, for each grounded sub-task;
  passing the plurality of concatenated result vectors of each grounded sub-task, to a second attention network of the argument type extraction model, to obtain one or more encoded context vectors of each grounded sub-task;
  passing each of the one or more encoded context vectors of each grounded sub-task, to a second LSTM network of the argument type extraction model, to generate a plurality of argument hidden vectors for each encoded context vector;
  concatenating (i) the plurality of argument hidden vectors for each encoded context vector and (ii) the plurality of encoded vectors pertaining to the training task instruction, to obtain a plurality of concatenated argument hidden vectors, for each encoded context vector;
  passing the plurality of concatenated argument hidden vectors, for each encoded context vector, to a second span detection network of the argument type extraction model, to generate an argument span for each encoded context vector;
  concatenating (i) the plurality of argument hidden vectors and (ii) the argument span, for each encoded context vector, to obtain concatenated span mark argument hidden vectors of each encoded context vector; and
  passing the concatenated span mark argument hidden vectors of each encoded context vector, to a third feed-forward layer of the argument type extraction model, to classify each encoded context vector, by a soft-max classifier of the argument type extraction model, to (i) extract the one or more arguments for each grounded sub-task, and (ii) map each argument with the predefined grounded argument class.

12. The system of claim 7, wherein the one or more hardware processors are further configured to:
  receive a real-time task instruction for the embodied robot configured to perform in the physical environment, from a subject, wherein the real-time task instruction is the natural language textual input; and
  pass the real-time task instruction, to the task and argument extraction model, to extract (i) the one or more grounded arguments, (ii) the one or more grounded sub-tasks in the form of the task sequence, and (iii) the one or more arguments along with associated predefined grounded argument classes, for the embodied robot to complete the real-time task instruction.

13. One or more non-transitory machine-readable information storage mediums comprising one or more instructions which when executed by one or more hardware processors cause:
  receiving, a training dataset comprising a plurality of training task instructions, wherein each training task instruction of the plurality of training task instructions is a natural language textual input;
  forming, one or more mini-batches from the plurality of training task instructions present in the training dataset, based on a mini-batch size, wherein each mini-batch comprises one or more training task instructions out of the plurality of training task instructions and wherein a number of the one or more training task instructions present in each mini-batch is determined based on the mini-batch size; and
  training, an encoder-decoder neural network, with the one or more training task instructions present in each mini-batch a time, until the one or more mini-batches are completed to obtain a task and argument extraction model utilized for an embodied robot, wherein the encoder-decoder neural network comprises an instruction encoder and a nested decoder, wherein the nested decoder comprises an object grounding model, a grounded task extraction model, and an argument type extraction model, and wherein training the encoder-decoder neural network with each training task instruction present in each mini-batch comprises:
    passing each training task instruction to the instruction encoder, to obtain a plurality of encoded vectors pertaining to each training task instruction;
    passing the plurality of encoded vectors pertaining to each training task instruction, to the object grounding model of the nested decoder, to obtain one or more grounded arguments along with a predefined grounded argument class of one or more predefined grounded argument classes for each grounded argument, wherein each grounded argument refers to a physical object type present in a physical environment;
    passing the plurality of encoded vectors pertaining to each training task instruction, to the grounded task extraction model of the nested decoder, to extract one or more grounded sub-tasks in a form of a task sequence, pertaining to each training task instruction;
    passing each grounded sub-task of the one or more grounded sub-tasks extracted by the grounded task extraction model, to the argument type extraction model of the nested decoder, to (i) extract one or more arguments for each grounded sub-task, and (ii) map each argument with the predefined grounded argument class;
    calculating a value of a loss function of the encoder-decoder neural network, for each mini-batch, wherein the loss function of the encoder-decoder neural network is calculated based on (i) a loss function of the object grounding model, (ii) a loss function of the grounded task extraction model, and (iii) a loss function of the argument type extraction model; and
    updating one or more network parameters of the encoder-decoder neural network, based on the value of the loss function of the encoder-decoder neural network, for training with a next mini-batch.

14. The one or more non-transitory machine-readable information storage mediums of claim 13, wherein passing each training task instruction to the instruction encoder, to obtain the plurality of encoded vectors pertaining to each training task instruction, comprises:

tokenizing each training task instruction using a pre-trained language model-based tokenizer of the instruction encoder, to obtain a plurality of tokens pertaining to each training task instruction; and passing the plurality of tokens pertaining to each training task instruction, to a pre-trained language model-based encoder of the instruction encoder, to obtain the plurality of encoded vectors pertaining to each training task instruction, wherein each encoded vector of the plurality of encoded vectors is associated to each token of the plurality of tokens pertaining to each training task instruction.

15. The one or more non-transitory machine-readable information storage mediums of claim 13, wherein passing the plurality of encoded vectors pertaining to each training task instruction, to the object grounding model of the nested decoder, to obtain the one or more grounded arguments along with the predefined grounded argument class of the one or more predefined grounded argument classes for each grounded argument comprises: passing the plurality of encoded vectors pertaining to each training task instruction, to a first feed-forward layer of the object grounding model, to classify each of the one or more grounded arguments, with the predefined grounded argument class, by a soft-max classifier of the object grounding model using a Beginning Inside and Outside (BIO) sequence labelling approach.

16. The one or more non-transitory machine-readable information storage mediums of claim 13, wherein passing the plurality of encoded vectors pertaining to each training task instruction, to the grounded task extraction model of the nested decoder, to extract the one or more grounded sub-tasks in the form of the task sequence, pertaining to each training task instruction, comprises:

passing the plurality of encoded vectors pertaining to each training task instruction, to a first attention network of the grounded task extraction model, to generate a context vector of each grounded sub-task of the one or more sub-tasks;

passing the context vector of each grounded sub-task of the one or more grounded sub-tasks, to a first long short-term memory (LSTM) network of the grounded task extraction model, to generate a plurality of task hidden vectors of each grounded sub-task;

concatenating (i) the plurality of encoded vectors and (ii) the plurality of task hidden vectors, of each grounded sub-task, pertaining to each training task instruction, to obtain a plurality of concatenated task hidden vectors for each grounded sub-task, pertaining to each training task instruction;

passing the plurality of concatenated task hidden vectors of each grounded sub-task, pertaining to each training task instruction, to a first span detection network of the grounded task extraction model, to generate a task span of each grounded sub-task;

concatenating (i) the plurality of task hidden vectors and (ii) the task span, of each grounded sub-task, to obtain a plurality of concatenated span mark task hidden vectors of each grounded sub-task; and passing the plurality of concatenated span mark task hidden vectors of each grounded sub-task, to a second feed-forward layer of the grounded task extraction model, to classify each of the one or more grounded sub-tasks, with a predefined grounded task class, by a soft-max classifier of the grounded task extraction model.

17. The one or more non-transitory machine-readable information storage mediums of claim 13, wherein passing each grounded sub-task of the one or more grounded sub-tasks extracted by the grounded task extraction model, to the argument type extraction model of the nested decoder, to (i) extract the one or more arguments for each grounded sub-task, and (ii) map each argument with the predefined grounded argument class, comprises:

concatenating (i) the plurality of encoded vectors, (ii) the plurality of task hidden vectors, and (iii) the one or more grounded arguments, of each grounded sub-task, to obtain a plurality of concatenated result vectors, for each grounded sub-task;

passing the plurality of concatenated result vectors of each grounded sub-task, to a second attention network of the argument type extraction model, to obtain one or more encoded context vectors of each grounded sub-task;

passing each of the one or more encoded context vectors of each grounded sub-task, to a second LSTM network of the argument type extraction model, to generate a plurality of argument hidden vectors for each encoded context vector;

concatenating (i) the plurality of argument hidden vectors for each encoded context vector and (ii) the plurality of encoded vectors pertaining to the training task instruction, to obtain a plurality of concatenated argument hidden vectors, for each encoded context vector;

passing the plurality of concatenated argument hidden vectors, for each encoded context vector, to a second span detection network of the argument type extraction model, to generate an argument span for each encoded context vector;

concatenating (i) the plurality of argument hidden vectors and (ii) the argument span, for each encoded context vector, to obtain concatenated span mark argument hidden vectors of each encoded context vector; and passing the concatenated span mark argument hidden vectors of each encoded context vector, to a third feed-forward layer of the argument type extraction model, to classify each encoded context vector, by a soft-max classifier of the argument type extraction model, to (i) extract the one or more arguments for each grounded sub-task, and (ii) map each argument with the predefined grounded argument class.

18. The one or more non-transitory machine-readable information storage mediums of claim 13, wherein the one or more instructions which when executed by one or more hardware processors further cause:

receiving, a real-time task instruction for the embodied robot configured to perform in the physical environment, from a subject, wherein the real-time task instruction is the natural language textual input; and passing, the real-time task instruction, to the task and argument extraction model, to extract (i) the one or more grounded arguments, (ii) the one or more grounded sub-tasks in the form of the task sequence, and (iii) the one or more arguments along with associated predefined grounded argument classes, for the embodied robot to complete the real-time task instruction.

* * * * *